United States Patent
Jacobs et al.

(10) Patent No.: US 10,755,146 B2
(45) Date of Patent: Aug. 25, 2020

(54) NETWORK ARCHITECTURE FOR GENERATING A LABELED OVERHEAD IMAGE

(71) Applicant: University of Kentucky Research Foundation, Lexington, KY (US)

(72) Inventors: Nathan Jacobs, Lexington, KY (US); Scott Workman, Richmond, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 81 days.

(21) Appl. No.: 16/045,606

(22) Filed: Jul. 25, 2018

(65) Prior Publication Data

US 2020/0034664 A1    Jan. 30, 2020

(51) Int. Cl.
    G06K 9/62      (2006.01)
    G06N 3/04      (2006.01)
    H04L 12/26     (2006.01)
    G06F 40/30     (2020.01)

(52) U.S. Cl.
    CPC .......... G06K 9/6262 (2013.01); G06F 40/30 (2020.01); G06N 3/04 (2013.01); H04L 43/08 (2013.01)

(58) Field of Classification Search
    None
    See application file for complete search history.

(56) References Cited

PUBLICATIONS

Hu, Sixing, et al. "CVM-net: Cross-view matching network for image-based ground-to-aerial geo-localization." Proceedings of the IEEE Conference on Computer Vision and Pattern Recognition. 2018. (Year: 2018).*
Vo, N. N., & Hays, J. (Oct. 2016). Localizing and orienting street views using overhead imagery. In European conference on computer vision (pp. 494-509). Springer, Cham. (Year: 2016).*
Cao, R., Zhu, J., Tu, W., Li, Q., Cao, J., Liu, B., . . . & Qiu, G. (2018). Integrating Aerial and Street View Images for Urban Land Use Classification. Remote Sensing, 10(10), 1553. (Year: 2018).*
Workman et al., "A Unified Model for Near and Remote Sensing", arXiv: 1708.03035v1 [cs.CV] Aug. 9, 2017, 14 total pages.
Wang et al., "Torontocity: Seeing the World with a Million Eyes", arXiv: 1612.00423, 2016, 9 total pages.

(Continued)

*Primary Examiner* — David Perlman
(74) *Attorney, Agent, or Firm* — Crowell & Moring LLP (57) ABSTRACT

A computer-implemented process is disclosed for generating a labeled overhead image of a geographical area. A plurality of ground level images of the geographical area is retrieved. A ground level feature map is generated, via a ground level convolutional neural network, based on features extracted from the plurality of ground level images. An overhead image of the geographical area is also retrieved. A joint feature map is generated, via an overhead convolutional neural network based on the ground level feature map and features extracted from the plurality of ground level images. Geospatial function values at a plurality of pixels of the overhead image are estimated based on at least the joint feature map and the overhead image. The plurality of pixels of the overhead image is labeled according to the estimated geospatial function values.

18 Claims, 4 Drawing Sheets

(56) References Cited

PUBLICATIONS

Simonyan et al., "Very Deep Convolutional Networks for Large-Scale Image Recognition", *International Conference on Learning Representations*, arXiv: 1409.1556v6 [cx.CV], Apr. 10, 2015, 14 total pages.

Bansal et al., "Pixelnet: Representation of the pixels, by the pixels, and for the pixels", arXiv: 1702.06506v1 [cx.CV], Feb. 21, 2017, 17 total pages.

* cited by examiner

NETWORK ARCHITECTURE FOR GENERATING A LABELED OVERHEAD IMAGE

FIELD OF THE INVENTION

The disclosed invention relates to systems and methods for generating a labeled overhead image.

BACKGROUND OF THE INVENTION

From predicting the weather to planning the future of our cities to recovering from natural disasters, accurately monitoring widespread areas of the Earth's surface is essential to many scientific fields and to society in general. These observations have traditionally been collected through remote sensing from satellites, aerial imaging, and distributed observing stations and sensors.

These approaches can observe certain properties like land cover and land use accurately and at a high resolution, but unfortunately, not everything can be seen from overhead imagery. For example, Wang, et al., in "Torontocity: Seeing the world with a million eyes," arXiv: 1612.00423 (2016), evaluates approaches for urban zoning and building height estimation from overhead imagery, and conclude that urban zoning segmentation "is an extremely hard task from aerial views," that building height estimation is "either too hard, or more sophisticated methods are needed."

More recently, the explosive popularity of geotagged social media has raised the possibility of using online user generated content as a source of information about geographic locations. This approach is sometimes referred to as image-driven mapping or proximate sensing. Mathematically, the result of this process can be represented as a geospatial function that takes as input a geographic location and generates as output a value of interest or a probability distribution over that value.

For example, online images from social network and photo sharing websites have been used to estimate land cover for large geographic regions, to observe the state of the natural world by recreating maps of snowfall, and to quantify perception of urban environments.

Despite differing applications, the prior approaches to proximate sensing each estimate the geospatial function, and view each social media artifact (e.g., geotagged ground-level image) as an observation of the value of this function at a particular geographic location.

These typical approaches to proximate sensing (1) collect a large number of samples, (2) use an automated approach to estimate the value of the geospatial function for each sample, and (3) use some form of locally weighted averaging to interpolate the sparse samples into a dense, coherent estimate of the underlying geospatial function. This estimation is complicated by the fact that observations are noisy because state-of-the-art recognition algorithms are imperfect, and therefore some images are inherently confusing or ambiguous, and the observations are distributed sparsely and non-uniformly. Accordingly, in order to estimate geospatial functions with reasonable accuracy, most techniques use a kernel with a large bandwidth to smooth out the noise. These approaches thus yield undesirably coarse, low-resolution outputs that are insufficient for many applications.

For example, many recent studies have explored analyzing large-scale image collections as a means of characterizing properties of the physical world.

Estimating properties of weather from geotagged and timestamped ground-level imagery has also been proposed.

However, these proposals do not utilize novel techniques for proximate sensing, but rather utilize the prior approaches, in which standard recognition techniques are applied to individual images, and then spatial smoothing and other noise reduction techniques are used to create an estimate of the geospatial function across the world.

Meanwhile, remote sensing has used computer vision to estimate properties of the Earth from satellite images. Overhead imaging is, however, markedly different from ground-level imaging, and so remote sensing techniques have largely been developed independently and in task-specific ways. As such, a framework for estimating geospatial functions via combining visual evidence from both ground level and overhead images has not been pursued.

Indeed, while it has been proposed to use visual evidence from ground level or overhead images or location context in order to improve classification or give context for event recognition in ground level or overhead images, these proposals do not combine visual evidence from both ground level and overhead images to estimate geospatial functions.

In contrast, the present invention is directed to a system that can estimate any given geospatial function of the world via integrating data from both ground level imagery (which often contains visual evidence that is not visible from the air) and overhead imagery (which is typically much more densely sampled), and which learns in an end-to-end way, avoiding the need for task-specific or hand-engineered features.

SUMMARY OF THE INVENTION

Systems and methods are therefore disclosed, which utilizes deep convolutional neural networks (CNN) to extract features from both overhead and ground level imagery so as to estimate geospatial functions.

For the ground-level images, kernel regression and density estimation techniques are used to convert sparsely distributed feature samples into a dense feature map spatially consistent with the overhead image. This differs from the traditional proximate sensing approach, which uses interpolation methods, such as kernel regression, to directly estimate the geospatial function.

The ground-level feature map is then concatenated with a feature map generated an overhead image CNN. Pixel-level labeling is achieved by applying a CNN to the concatenated feature map, for example, via extracting multiscale features in the form of a hypercolumn, and using a small neural network to estimate the geospatial function of interest.

The inventive approach may also utilize a spatially varying kernel that depends on features extracted from the overhead imagery.

The CNN architecture may further be trained end-to-end, so that all free parameters, including kernel bandwidths and low-level image features, are automatically tuned to minimize the loss function.

The CNN architecture may be used with most state-of-the-art CNNs, and is easily adaptable for use with any sparsely distributed media, including geotagged audio, video, and text (e.g., tweets).

Other features and advantages of the present invention will become apparent from the following more detailed description, taken in conjunction with the accompanying drawings, which illustrate, by way of example, the principles of the presently described embodiments.

DETAILED DESCRIPTION OF THE PREFERRED EMBODIMENTS

The above described drawing figures illustrate the disclosed invention in at least one of its preferred, best mode embodiment, which is further defined in detail in the following description. Those having ordinary skill in the art may be able to make alterations and modifications to what is described herein without departing from its spirit and scope. While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspects of the invention to any embodiment illustrated. Therefore, it should be understood that what is illustrated is set forth only for the purposes of example and should not be taken as a limitation on the scope of the disclosed invention.

In general, the present invention attempts to estimate a spatially varying property of the physical world, which is modeled as an unobservable mathematical function that maps latitude-longitude coordinates to possible values of the property:

$$F: \mathbb{R}^2 \to y.$$

The range Y of this function depends on the attribute to be estimated, and might be categorical (e.g., a discrete set of elements for land use classification—golf course, residential, agricultural, etc.) or continuous (e.g., population density). The present invention estimates this function based on the available observable evidence, including data sampled both densely (such as overhead imagery) and sparsely (such as geotagged ground-level images). From a probabilistic perspective, one can think of the task as learning a conditional probability distribution:

$$P(F(l)=y|S_l, G(l)),$$

where l is a latitude-longitude coordinate, $S_l$ is an overhead image centered at that location, and G(l) is a set of nearby ground level images.

Systems and methods are therefore disclosed, which fuse high-resolution overhead imagery and nearby ground-level imagery to estimate the value of a geospatial function at a target location. While the present disclosure focuses on images, the overall system architecture may be used with many sources of dense and sparse data. The system architecture allows the system to be trained in an end-to-end manner, which in turn enables the system to learn to optimally extract features from both the dense and sparse data sources.

Figure 1:
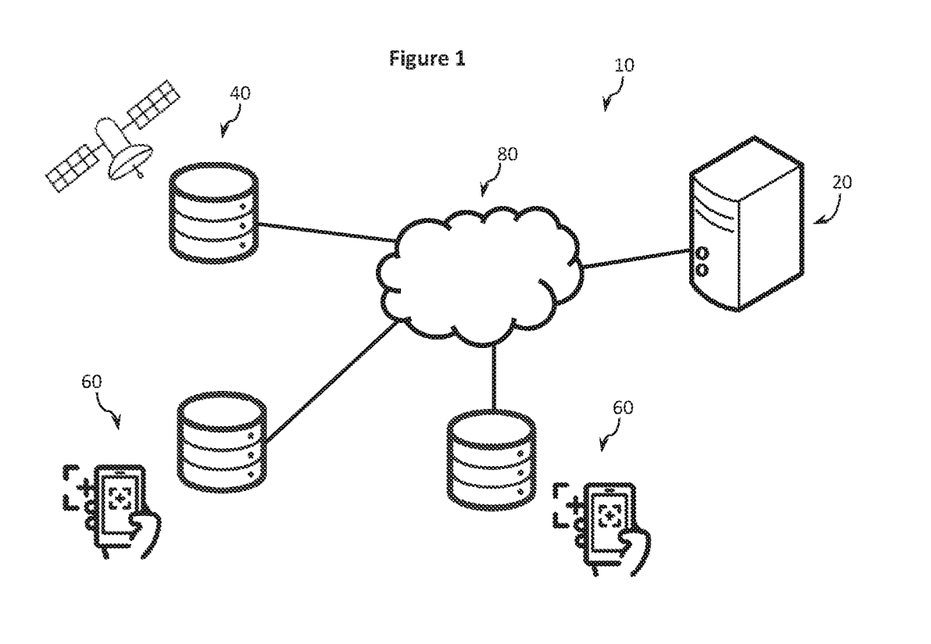
FIG. 1 is a schematic diagram of a computer-based system for generating a labeled overhead image of a geographical area according to at least one embodiment of the present invention.

FIG. 1 schematically illustrates a computer-based system 10 for generating a labeled overhead image of a geographical area in accordance with the principles of the invention described herein. The system generally includes a server system 20, which may be distributed on one or more physical servers, each having a processor, a memory, an operating system, an input/output interface, and a network interface, all known in the art, as well as an overhead image source 40 and a plurality of ground level image sources 60, each communicatively coupled to a network 80.

Figure 2:
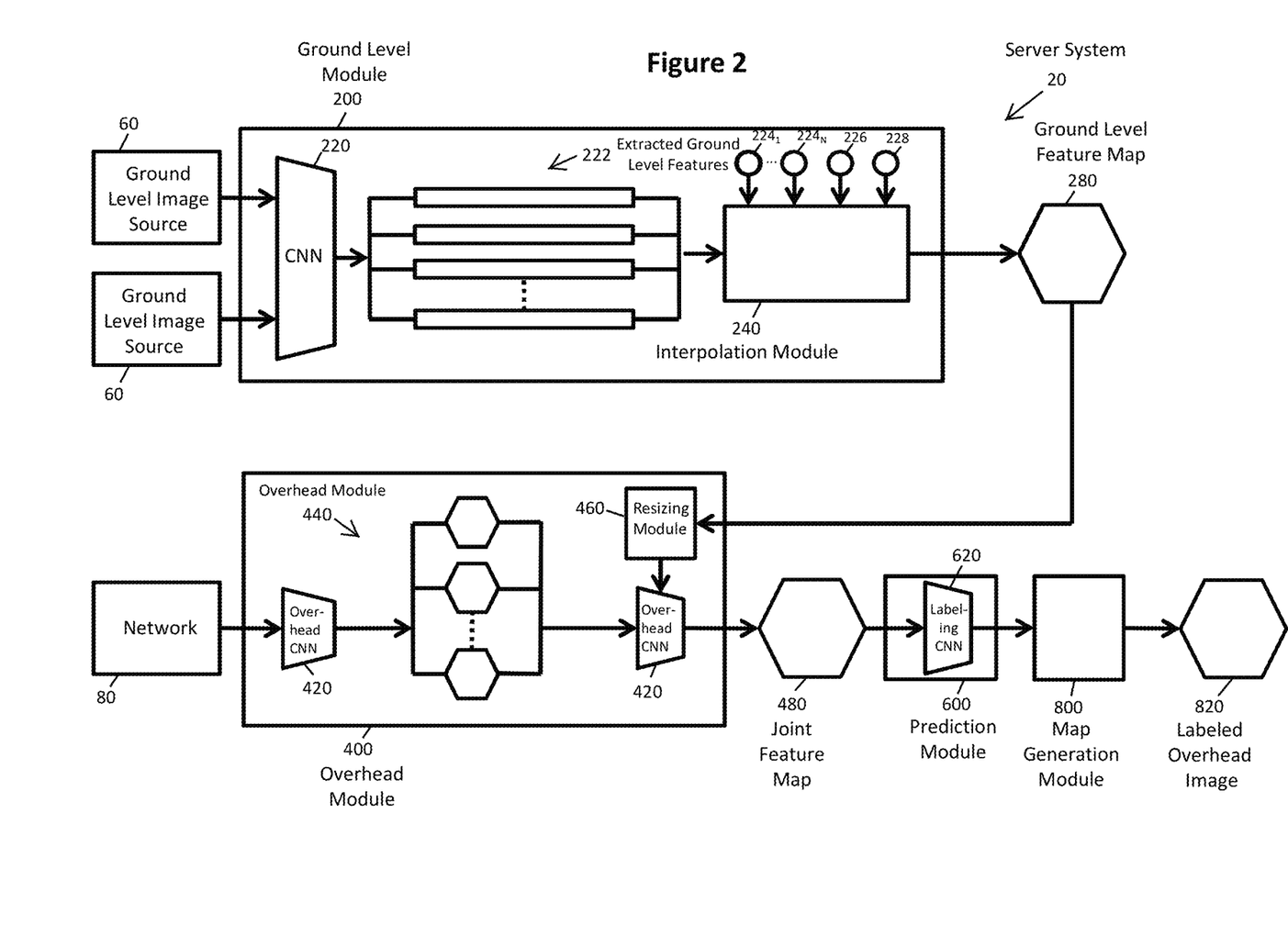
FIG. 2 is a schematic diagram of a server system of the computer-based system according to at least one embodiment of the present invention.

An exemplary embodiment of the server system is shown in FIG. 2. The server system generally includes a computer application configured to generate a labeled overhead image, which has encoded therein function value (or distribution over values) for every pixel in the overhead image. To accomplish this, the computer application utilizes a complex neural network ("CNN") architecture to combine features extracted from the overhead image and a plurality of ground level images, each image captured at a known geographic location The system generally includes a ground level module 200 communicatively coupled to an overhead module 400, which is in turn communicatively coupled to a prediction module 600 that is in turn communicatively coupled to a map generation module 800.

The ground level module 200 is communicatively coupled to the one or more ground level image sources 60 and to the overhead module 400, and is configured to generate a ground level feature map 280 from a set of ground level images received from the ground level image sources 60.

The ground level module 200 preferably includes a ground level convolutional neural network ("CNN") 220, which may comprise one or more such CNNs. The ground level module 200 is configured to utilize the ground level CNN 220 to extract one or more ground level features $222_{1-N}$ from each ground level image.

The ground level module 200 also includes an interpolation module 240. The interpolation module is configured to generate the ground level feature map 280 based on the extracted ground level features $222_{1-N}$ via an interpolation technique, e.g., kernel regression. The interpolation module may also receive as input the geolocations $224_{1-N}$ of the ground level features $222_{1-N}$, a bounding box 226 and a kernel bandwidth 228.

The overhead module 400 is communicatively coupled to the ground level module 200 and the overhead image source. The overhead module 400 is configured to receive the overhead image and the ground level feature map 280, and to generate a joint feature map 480 therefrom.

The overhead module 400 includes an overhead CNN 420. The overhead module 400 is configured to use a subset of the convolutional layers of the overhead CNN 420 to extract meaningful features from the overhead image, and to generate a plurality of overhead feature maps $440_{1-n}$ therefrom.

The overhead module 400 also includes a resizing module 460. The resizing module is configured to resize the ground level feature map 280 received from the ground level module 200. The resizing module resizes the ground level feature map 280, e.g., via average pooling or similar method, so that the spatial extents of the feature maps are aligned.

The overhead module is also configured to utilize the overhead CNN 420 to concatenate the ground level feature map 280 and the overhead feature maps $440_{1-n}$. The overhead module is also configured to utilize the further convolutional layers of the overhead CNN 420 to further processes the concatenated feature maps so as to generate the joint feature map 480.

The system still further includes a prediction module 600 commutatively coupled to the overhead module 440. The prediction module 600 is configured to estimate the geospatial function value at a pixel location based on the joint feature map 480.

The prediction module 600 includes a labeling CNN 620, e.g., a small multilayer perceptron ("MLP"). The labeling CNN 620 is configured to receive the joint feature map 480 and generate pixel-level labels for the overhead image based on a hypercolumn of one or more of the feature maps, in accordance with known techniques. In particular, each feature map is resized to match, and the hypercolumn, consisting of a set of features centered at the pixel location, is extracted from the resized feature maps. The geospatial function value is then estimated from the hypercolumn via the labeling CNN 620. The resulting pixel-level labels correspond to probability distributions of the value of the geospatial function at the geospatial location corresponding to each pixel location.

The server still further includes a map generation module 800 communicatively coupled to the prediction module 600. The map generation module 800 is configured to assign a unique visual indicator, e.g., a color, to the pixels of the overhead image according to the probability distribution at that pixel, thereby generating a labeled overhead image 820. For example, the pixel may be assigned the color blue, if there is a high probability that the geospatial function value at the pixel corresponds to water. This process is preferably automated. Because of the better accuracy of the probability distributions, the labeled overhead image 820 is generated, which is more accurate and complete that prior such images.

Figure 3:
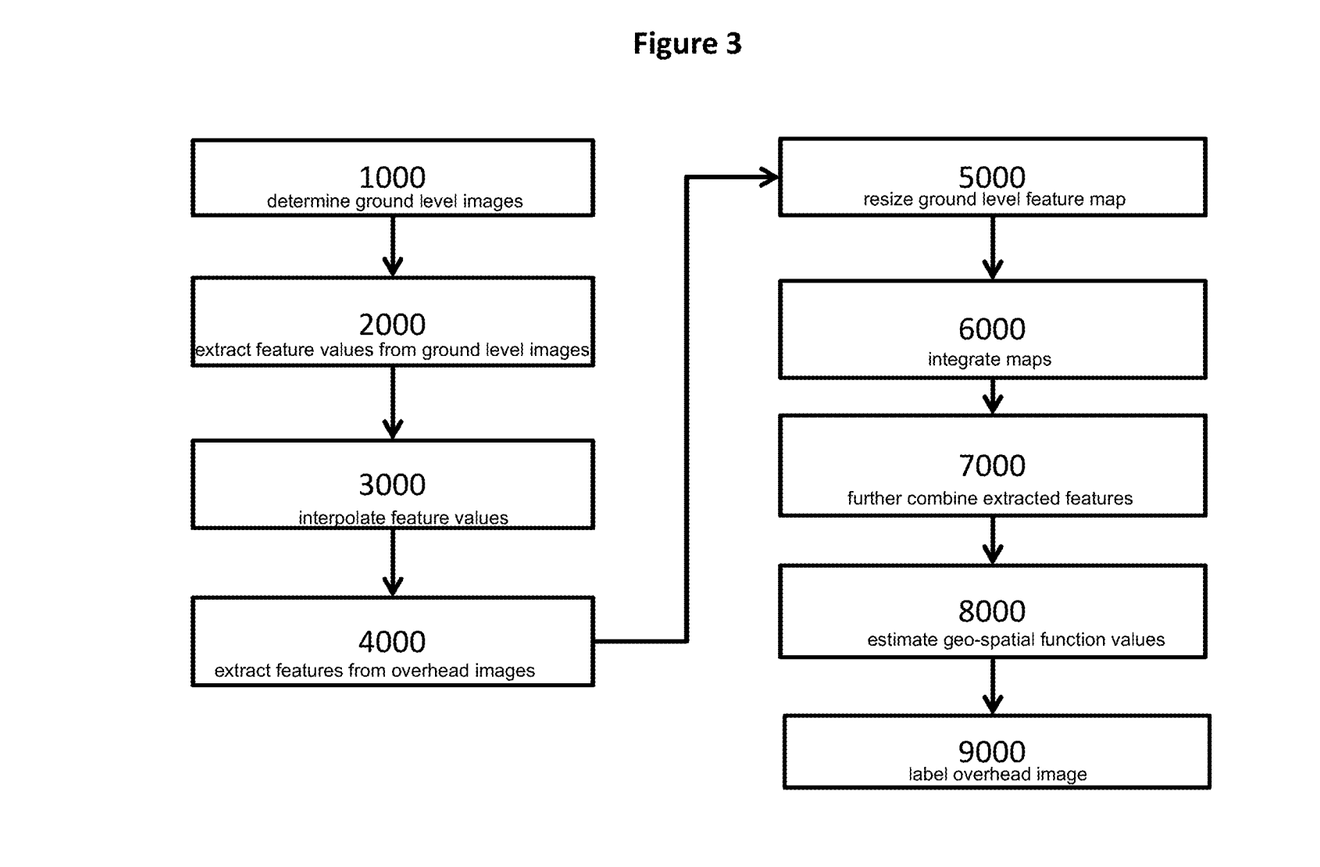
FIG. 3 is a flow-chart of a method for generated the labeled overhead image of the geographical area according to at least one embodiment of the present invention.

A method 1000 for labeling an overhead image in accordance with at least one embodiment will now be described with reference to FIGS. 2-3.

Ground Level Feature Map Construction:

As discussed above, the ground level feature map is generated from the set of ground level images received form the plurality of ground level image sources 60.

At step 1000, for a given geographic location l, the ground level feature map module 200 determines a set of N elements corresponding to the closest N ground level images to the location l. This set may be represented as $G(l)=\{(G_i, l_i)\}$, where $(G_i, l_i)$ is a ground level image and its respective geographic location.

At step 2000, the ground-level CNN 220 extracts feature values, $f_g(G_i)$, from each image. Preferably, the ground level CNN 220 is trained to extract meaningful feature values from the ground level imagery, i.e., values for those features that are useful to the system to ultimately provide the desired labels to the overhead image to produce the labeled overhead image. For example, if the overhead image is to be labeled according to terrain, the feature values may include water, land, forest, etc. In some embodiments, the ground level CNN 220 is trained to accurately classify, i.e., extract meaningful features from, the ImageNet dataset.

At step 3000, the features extracted by the ground level CNN are used by the interpolation module 240 to interpolate feature values for the ground level feature map 280. Pixel-by-pixel interpolation is preferably accomplished using kernel regression. In at least one embodiment, interpolation is accomplished using Nadaraya-Watson kernel regression:

$$f_G(l) = \frac{\Sigma w_i f_g(G_i)}{\Sigma w_i},$$

where $w_i=\exp(-d(l, l_i; \Sigma)^2)$ is a Gaussian kernel function where a diagonal covariance matrix controls a kernel bandwidth, and $d(l, l_i; \Sigma)$ is the Mahalanobis distance from l to $l_i$.

Interpolation is preferably performed for each pixel location of the overhead image. The result of the pixel-by-pixel interpolation is the ground level feature map having a size of H×W×m, where H and W are the height and width of the overhead image in pixels, and m is the output dimensionally of the ground level CNN, $f_g(G_i)$.

The diagonal elements of the covariance matrix are represented by a pair of trainable weights, which pass through a softplus function (i.e. $f(x)=\ln(1+e^x)$) to ensure they are positive. In at least one embodiment, the value of the diagonal covariance matrix does not depend on the geographic location l, i.e., it is spatially uniform. However, in at least one alternative embodiment, discussed further herein, the value of the diagonal covariance matrix does depend on the geographic location l, i.e., it is spatially varying.

In some embodiments, the ground level CNN corresponds a VGG-16 neural network, initialized with weights for Place categorization (m=205, layer name 'fc8'). In such embodiments, the result is an 820-dimensional feature vector for each location, which is further reduced to 50 dimensions. Initializing a VGG-16 neural network with weights for place categorization is generally known in the art.

In some embodiments, the nearest ground-level image may be far away from the geographic location l. This may lead to later processing stages incorrectly interpreting the feature map at the geographic location l. Accordingly, in at least one embodiment, a kernel density estimate (i.e., kernel bandwidth 228) of the ground level image locations is concatenated to the ground level feature map, using the kernel defined above. The kernel density estimate concatenated to the ground level feature map may then be appropriately utilized by the labeling CNN in labeling the concatenated feature map.

The result of the concatenation is an H×W×N ground level feature map that captures appearance and distributional information of the ground level images, where N is the ground level feature dimensionality plus the kernel density estimate. In the embodiment discussed above, the result of the concatenation is an H×W×51 ground level feature map produced from the final convolutional layer of the ground level CNN.

In some embodiments, the ground level images, G(l), include geo-oriented street-level panoramas. Accordingly, in at least one embodiment, extracting the ground level features from each ground level image includes generating a feature representation for each panorama, $G_i$. The panorama may be divided into a plurality of perspective images according to orientation (e.g., North, South, East, and West), such that corresponding ground level images are generated at each location. The ground level image CNN, $f_g(G_i)$, may then be replicated, and each such ground level image fed through separately. The individual outputs may then be concatenated to form a feature vector for the geographic location. In at least one embodiment, a linear projection, implemented as a convolutional operator, is added to reduce the feature dimensionality.

Overhead Feature Map Construction:

As discussed above, the joint feature map is generated from the ground level feature map and the overhead image.

At step 4000, the overhead module 400 uses the overhead CNN 420 to extract features from the overhead image and to generate a plurality of overhead feature maps therefrom. As with the ground level CNN 220, the overhead CNN 420 is preferably trained to extract meaningful features from the overhead images. In some embodiments, the overhead CNN 420 is trained to classify the ImageNet dataset.

In accordance with the feature extraction, at each of its convolutional layers, the overhead CNN 420 generates the plurality of overhead feature maps $440_{1-n}$, each overhead feature map $440_{1-n}$ associated with a corresponding convolutional layer of the overhead CNN 420.

In some embodiments, the overhead CNN 420 may be based on the VGG-16 architecture. The VGG-16 architecture has 13 convolutional layers, each using 3×3 convolutions, and three fully connected convolutional layers. An exemplary VGG-16 architecture is disclosed by Simonyan et al., in "Very deep convolutional networks for large-scale image recognition," *International Conference on Learning Representations* (2015), which is herein incorporated by reference in its entirety.

Preferably, the overhead module 400 utilizes a subset of available convolutional layers of the overhead CNN 420 to generate the overhead feature maps $440_{1-n}$. This results in overhead feature maps $440_{1-n}$ of size H'×W'×N'. In some embodiments, only the convolutional layers typically referred to as conv-$\{1_{1-2}, 2_{1-2}, 3_{1-2}, 4_{1-2}, 5_{1-2}\}$ are used. This generates, for example, the plurality of overhead feature maps $440_{1-n}$ of size 32×32×128.

At step 5000, the ground level feature map 280 is introduced to the overhead module 400, or more particularly, the overhead CNN 420, via the resizing module 460, which resizes the ground level feature map 280 to match the size of the overhead feature maps $440_{1-n}$.

In other words, the size of the ground level feature map 280 is changed from H×W to H'×W'. In some embodiments, the size of the ground level feature map 280 is changed via average pooling or extracting a subset of pixels, in accordance with known techniques. For example, in some embodiments, an average pooling with a kernel size of 2×2 and a stride of 2 is applied three times. This reduces the ground level feature map 280 to 32×32×51. Accordingly, in the above example, the ground level feature map 280 that was H×W just prior to resizing is resized to the 32×32 size of the overhead feature maps 440.

At step 6000, the ground level feature map 280 is integrated with the overhead feature maps $440_{1-n}$. In particular, the feature maps are concatenated as to dimensionality, i.e., the N value, or in the channels dimension. For example, the ground level feature map may be concatenated with the overhead feature maps at the seventh convolutional layer, $3_3$. As to the concatenating, since 51+128=179, the result is a 32×32×179 concatenation.

At step 7000, the overhead module 400 utilizes the remaining convolutional layers of the overhead CNN 420 to further combine the features extracted from the overhead image and the concatenated feature maps, thereby generating the joint feature map 480. In particular, the joint feature map 480 is the result of the final convolutional layer of the overhead CNN 420, as applied to the concatenated feature maps and the extracted features.

Geospatial Function Prediction:

At step 8000, the prediction module 600 estimates the geospatial function value at the various pixel locations of the overhead image, based on the hypercolumn generated based on one or more of: the ground level feature map, the several overhead feature maps, and the joint feature map, but at least the joint feature map and the overhead feature maps. Any semantic labeling architecture may be used to estimate the geospatial function value at the pixel location. An exemplary semantic labeling architecture is PixelNet, described by Bansal et al., in "Pixelnet: Representation of the pixels, by the pixels, and for the pixels," arXiv preprint arXiv: 1702.06506 (2017), incorporated herein by reference.

For example, given the overhead image, $S_l$, the ground level feature map and the overhead feature map are used to estimate the value of the geospatial function:

$$F(l(p)) \in 1 \ldots K$$

where l(p) is the location of pixel p. The pixel may be at the center of the image for the image classification setting or any arbitrary pixel in the pixel-level labeling setting. Each feature map is resized to be H×W using bilinear interpolation. The hypercolumn is then extracted. The hypercolumn consists of a set of features centered at the pixel location, p. The hypercolumn may be represented as:

$$h_p(S) = [c_1(S,p), c_2(S,p), \ldots, c_M(S,p)],$$

where $c_i$ is the feature map of the i-th layer. Preferably, hypercolumn features are extracted from the convolutional layers of conv-$\{1_{1-2}, 2_{1-2}, 3_{1-2}, 4_{1-2}, 5_{1-2}\}$ and the ground level feature map. The resulting feature map has a length of 1,043. The hypercolumn is then passed to the labelling CNN 620, e.g., the MLP, which provides the estimate of the geospatial function. For example, the labelling CNN may have three convolutional layers of size 512, 512 and K, and each intermediate layer may utilize a leaky ReLU activation function so as to estimate the geospatial function value at the pixel location, based on the hypercolumn.

It has been observed that resizing all intermediate feature maps to be the size of the image is memory intensive. Accordingly, in at least one embodiment, the system sub-samples images during training to increase the number (and therefore diversity) of images per mini-batch. At testing time, the system can generate the hypercolumn for all pixels to create a dense semantic labeling, or a subset to label particular locations.

Labeling the Overhead Image:

At step 9000, the map generation module 800 labels the overhead image for whose pixels the prediction module 600 estimated the geospatial function value. In particular, a unique visual indicator, e.g., a color, is assigned to the pixels of the overhead image according to the probability distribution at the particular pixel, thereby generating the labeled overhead image 820. This is done in accordance with known techniques for labeling overhead images, given estimated geospatial function values.

Figure 4:
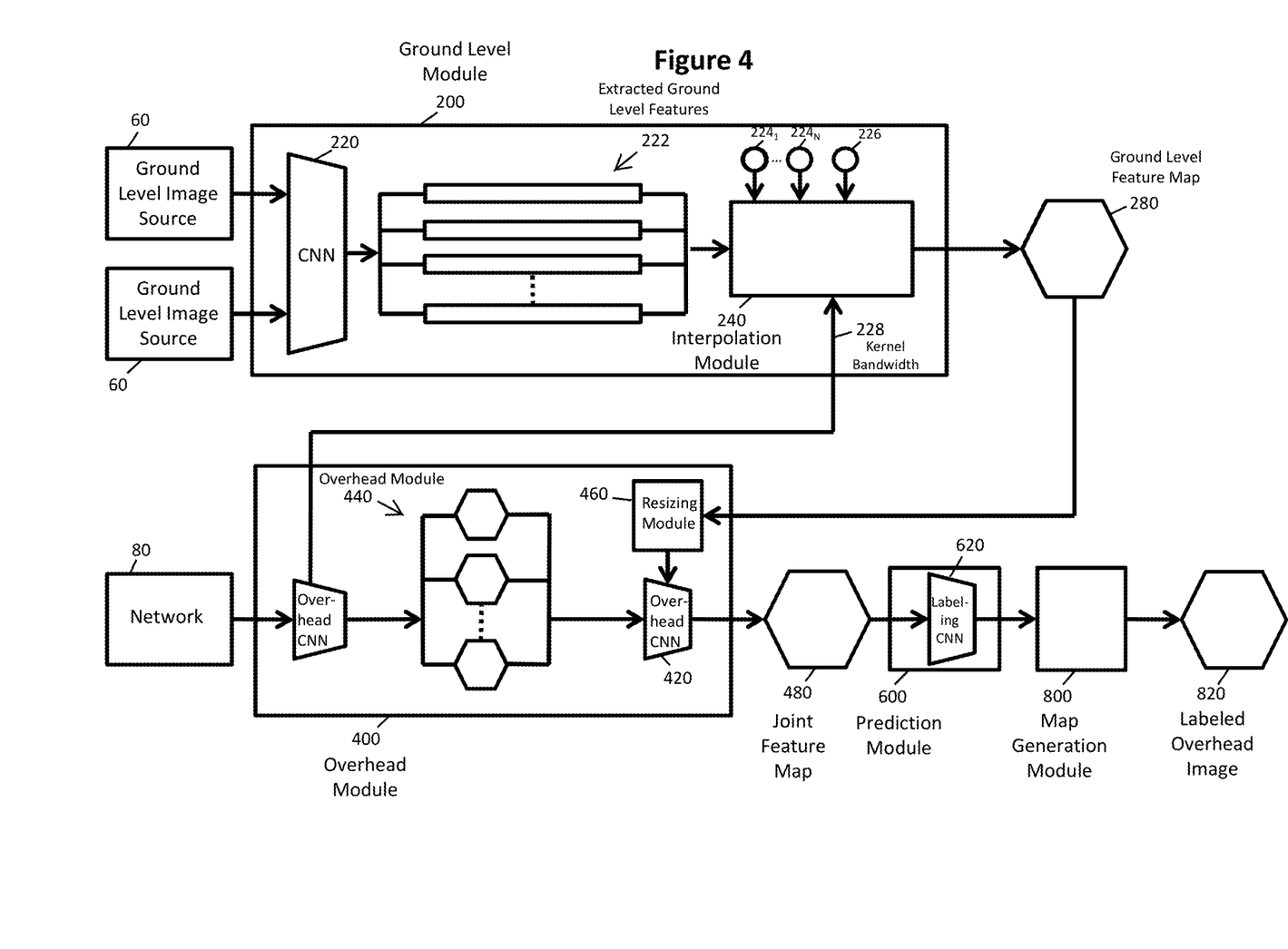
FIG. 4 is a schematic diagram of a server system of the computer-based system according to at least one embodiment of the present invention.

Adaptive Kernel Bandwidth Estimation:

In an alternative embodiment, shown for example in FIG. 4, an adaptive approach may be used by the interpolation module 240 to predict the optimal kernel bandwidth parameters for each location in the ground level feature map. In other words, the interpolation module 420 may utilize a kernel CNN (not shown) applied to the overhead image to estimate the kernel bandwidth parameters utilized in the above described interpolation.

For example, the kernel CNN may share the first three groups of convolutional layers with the overhead CNN, e.g., conv-$\{1_1, \ldots, 3_3\}$. The output of these convolutions may then be passed to a sequence of three convolutional transpose layers, each with filter size 3×3 and a stride of 2. These convolutional transpose layers have output dimensionality of 32, 16, and 2, respectively. The final convolutional layer has an output size of H×W×2, which represents the diagonal entries of the kernel bandwidth matrix, Σ, for each pixel location.

The softplus activation is applied to the output of the kernel CNN (initialized with a small constant bias) to ensure positive kernel bandwidth. The adaptive kernel bandwidth parameters are then used to construct the ground-level feature map (H×W×51), as described above.

The inventor's work entitled "A Unified Model for Near and Remote Sensing," which describes an experimental evaluation of the inventive approach with a large real-world dataset consisting of most of two major boroughs of New York City (Brooklyn and Queens), is submitted herewith and is hereby incorporated by reference in its entirety. The experimental results show that the inventive technique for fusing overhead and ground-level imagery is more accurate than either the remote or proximate sensing approach alone, and that the automatically-estimated spatially-varying kernel improves accuracy compared to one that is uniform.

The embodiments described in detail above are considered novel over the prior art of record and are considered critical to the operation of at least one aspect of the invention and to the achievement of the objectives of the invention. The words used in this specification to describe the exemplary embodiments are to be understood not only in the sense of their commonly defined meanings, but also to include any special definition with regard to structure, material or acts that would be understood by one of ordinary skilled in the art to apply in the context of the entire disclosure.

The definitions of the words or drawing elements described herein are meant to include not only the combination of elements which are literally set forth, but all equivalent structures, materials or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim without departing from the scope of the invention.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

Furthermore, the functionalities described herein may be implemented via hardware, software, firmware or any combination thereof, unless expressly indicated otherwise. If implemented in software, the functionalities may be stored in a memory as one or more instructions on a non-transitory computer readable medium, including any available media accessible by a computer that can be used to store desired program code in the form of instructions, data structures or the like. Thus, certain aspects may comprise a computer program product for performing the operations presented herein, such computer program product comprising a non-transitory computer readable medium having instructions stored thereon, the instructions being executable by one or more processors to perform the operations described herein. It will be appreciated that software or instructions may also be transmitted over a transmission medium, as is known in the art. Further, software and/or hardware modules and/or other appropriate means for performing the operations described herein may be utilized in implementing the functionalities described herein.

The scope of this description is to be interpreted in conjunction with the appended claims.

What is claimed is:

1. A method for generating a labeled overhead image of a geographical area, the process comprising:
   retrieving a plurality of ground level images of the geographical area;
   generating, via a ground level convolutional neural network, a ground level feature map based on features extracted from the plurality of ground level images;
   retrieving an overhead image of the geographical area;
   generating, via an overhead convolutional neural network, a joint feature map based on the ground level feature map and features extracted from the overhead image;
   estimating geospatial function values at a plurality of pixels of the overhead image based on at least the joint feature map and the overhead image; and
   labeling the plurality of pixels of the overhead image according to the estimated geospatial function values,
   wherein the feature maps associate feature values with geolocations of the respective images.

2. The method of claim 1, wherein generating the joint feature map includes:
   applying a subset of convolutional layers of the overhead convolutional neural network to extract features from the overhead image so as to generate a plurality of overhead feature maps therefrom, each overhead feature map corresponding to a respective convolutional layer;
   concatenating the plurality of overhead feature maps and the ground level feature map; and
   applying a remainder of the convolutional layers of the overhead convolutional neural network to the concatenated feature maps and the extracted features so as to generate the joint feature map.

3. The method of claim 1, wherein generating the ground level feature map includes:
   interpolating feature values, via kernel regression, according to one or more kernel bandwidths.

4. The method of claim 3, wherein interpolating feature values includes: determining, for each geolocation, an optimal kernel bandwidth.

5. The method of claim 4, wherein determining the optimal kernel bandwidth is via applying a kernel convolutional network to the overhead image so as to estimate the optimal kernel bandwidth.

6. The method of claim 1, wherein estimating the geospatial function values includes: applying a semantic labeling architecture to a hypercolumn generated based on the ground level feature map and/or the overhead feature maps and/or and the joint feature map.

7. A system for generating a labeled overhead image of a geographical area, the system comprising:
   ground level module configured to:
   retrieve a plurality of ground level images of the geographical area from at least one ground level image source, and generate, via a ground level convolutional neural network, a ground level feature map based on features extracted from the plurality of ground level images;

an overhead module configured to:
retrieve an overhead image of the geographical area from an overhead image source, and
generate, via an overhead convolutional neural network, a joint feature map based on the ground level feature map and features extracted from the overhead image;

a prediction module configured to estimate geospatial function values at a plurality of pixels of the overhead image based on at least the joint feature map and the overhead image; and a map generation module configured to label the plurality of pixels of the overhead image according to the estimated geospatial function values, wherein the feature maps associate feature values with geolocations of the respective images.

8. The system of claim 7, wherein generating the joint feature map includes:
applying a subset of convolutional layers of the overhead convolutional neural network to extract features from the overhead image so as to generate a plurality of overhead feature maps therefrom, each overhead feature map corresponding to a respective convolutional layer;
concatenating the plurality of overhead feature maps and the ground level feature map; and
applying a remainder of the convolutional layers of the overhead convolutional neural network to the concatenated feature maps and the extracted features so as to generate the joint feature map.

9. The system of claim 7, wherein generating the ground level feature map includes: interpolating feature values, via kernel regression, according to one or more kernel bandwidths.

10. The system of claim 9, wherein interpolating feature values includes: determining, for each geolocation, an optimal kernel bandwidth.

11. The system of claim 10, wherein determining the optimal kernel bandwidth is via applying a kernel convolutional network to the overhead image so as to estimate the optimal kernel bandwidth.

12. The method of claim 7, wherein estimating the geospatial function values includes: applying a semantic labeling architecture to a hypercolumn generated based on the ground level feature map and/or the overhead feature maps and/or and the joint feature map.

13. A non-transitory computer readable storage medium storing one or more programs that, when executed by a computer cause the computer to perform a method for generating a labeled overhead image of a geographical area, the method comprising:
retrieving a plurality of ground level images of the geographical area;
generating, via a ground level convolutional neural network, a ground level feature map based on features extracted from the plurality of ground level images;
retrieving an overhead image of the geographical area;
generating, via an overhead convolutional neural network, a joint feature map based on the ground level feature map and features extracted from the overhead image;
estimating geospatial function values at a plurality of pixels of the overhead image based on at least the joint feature map and the overhead image; and
labeling the plurality of pixels of the overhead image according to the estimated geospatial function values,
wherein the feature maps associate feature values with geolocations of the respective images.

14. The method of claim 13, wherein generating the joint feature map includes:
applying a subset of convolutional layers of the overhead convolutional neural network to extract features from the overhead image so as to generate a plurality of overhead feature maps therefrom, each overhead feature map corresponding to a respective convolutional layer;
concatenating the plurality of overhead feature maps and the ground level feature map; and
applying a remainder of the convolutional layers of the overhead convolutional neural network to the concatenated feature maps and the extracted features so as to generate the joint feature map.

15. The method of claim 13, wherein generating the ground level feature map includes: interpolating feature values, via kernel regression, according to one or more kernel bandwidths.

16. The method of claim 15, wherein interpolating feature values includes: determining, for each geolocation, an optimal kernel bandwidth.

17. The method of claim 16, wherein determining the optimal kernel bandwidth is via applying a kernel convolutional network to the overhead image so as to estimate the optimal kernel bandwidth.

18. The method of claim 13, wherein estimating the geospatial function values includes: applying a semantic labeling architecture to a hypercolumn generated based on the ground level feature map and/or the overhead feature maps and/or and the joint feature map.

* * * * *